United States Patent
Lundell

(10) Patent No.: US 8,076,876 B2
(45) Date of Patent: Dec. 13, 2011

(54) SERVOMOTOR SYSTEM WITH INTEGRATED BRAKE CONTROL

(75) Inventor: Thomas D. Lundell, Lakeville, MN (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 30 days.

(21) Appl. No.: 12/684,327

(22) Filed: Jan. 8, 2010

(65) Prior Publication Data

US 2011/0169433 A1     Jul. 14, 2011

(51) Int. Cl.
   *H02K 7/10* (2006.01)
(52) U.S. Cl. ............... 318/362; 318/757; 318/625
(58) Field of Classification Search .......... 318/362, 318/757, 86, 625, 432, 434; 180/421
   See application file for complete search history.

(56) References Cited

U.S. PATENT DOCUMENTS

| | | | | |
|---|---|---|---|---|
| 4,560,913 | A * | 12/1985 | Min ........................ | 318/760 |
| 5,238,082 | A * | 8/1993 | Stegeman et al. ........ | 180/208 |
| 6,223,993 | B1 * | 5/2001 | Lawrence ................ | 236/49.4 |
| 7,424,998 | B1 * | 9/2008 | Barney .................... | 254/334 |
| 2006/0186102 | A1 * | 8/2006 | Inagaki et al. .......... | 219/130.21 |

* cited by examiner

*Primary Examiner* — Karen Masih
(74) *Attorney, Agent, or Firm* — Fletcher Yoder, P.C.; R. Scott Speroff; John M. Miller

(57) ABSTRACT

A servomotor system is provided. The servomotor system includes an enclosure and a motor stator and rotor disposed in the enclosure. The servomotor system also includes a motor brake disposed in the enclosure and configured to selectively brake the rotor from rotation and a brake control switch disposed in the enclosure and coupled to the motor brake for selectively providing power to the motor brake for selectively engaging and/or disengaging the brake.

20 Claims, 2 Drawing Sheets

SERVOMOTOR SYSTEM WITH INTEGRATED BRAKE CONTROL

BACKGROUND

The invention relates generally to a motor braking technique for motor drive systems such as servomotor drive systems.

Electric motors such servo motors are employed in a variety of applications such as material packaging, metal forming applications and so forth. In many such applications, it is desirable to rapidly brake rotation of the rotor to stop the motor during certain phases of operation, or in case power is interrupted either intentionally or due to any system fault, or at times simply to hold a mechanical load without movement. Various types of braking devices are known including mechanical and electrical brakes that are controlled by brake control circuitry coupled to the drive of such systems. Typically, the cost of the brake control circuitry, which is included in the servo motor drive, is included with every drive axis of such systems, even though only a small percentage of axes actually require it. The motors themselves may or may not include a brake, depending upon the application requirements.

Accordingly, it would be desirable to develop an efficient and cost effective motor braking system that may be selectively used for braking motors in appropriate systems, where needed.

BRIEF DESCRIPTION

Briefly, according to one embodiment of the present invention, a servomotor system is provided. The servomotor system includes an enclosure and a motor stator and rotor disposed in the enclosure. The servomotor system also includes a motor brake disposed in the enclosure and configured to selectively brake the rotor from rotation. A brake control switch is disposed in the enclosure and coupled to the motor brake for selectively providing power to the motor brake for selectively engaging and/or disengaging the brake.

In accordance with another aspect, a servomotor system is provided. The servomotor system includes an enclosure, a motor stator and rotor disposed in the enclosure, and a motor brake disposed in the enclosure and configured to selectively brake the rotor from rotation. The servomotor system also includes a brake control switch disposed in the enclosure and coupled to the motor brake for selectively providing power to the motor brake for selectively engaging and/or disengaging the brake. An input/output circuit is also disposed in the enclosure and coupled to the brake control switch for applying control signals to the brake control switch, the brake control switch being configured to selectively engage and/or disengage the brake in response to the control signals. The servomotor system also includes circuitry external to the enclosure configured to apply brake signals to the input/output circuit for control of the brake.

In accordance with another aspect, a method of braking a rotor of a servomotor system is provided. The method includes applying control signals to a brake control switch using an input/output circuit disposed within an enclosure of the servomotor system to selectively engage and/or disengage a motor brake disposed within the enclosure in response to the control signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide an integrated brake system for motor drive systems such as servomotor systems employed in motion control applications. In particular, the integrated brake system includes an input/output circuit disposed within an enclosure of the servomotor system for controlling operation of a motor brake of such system.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
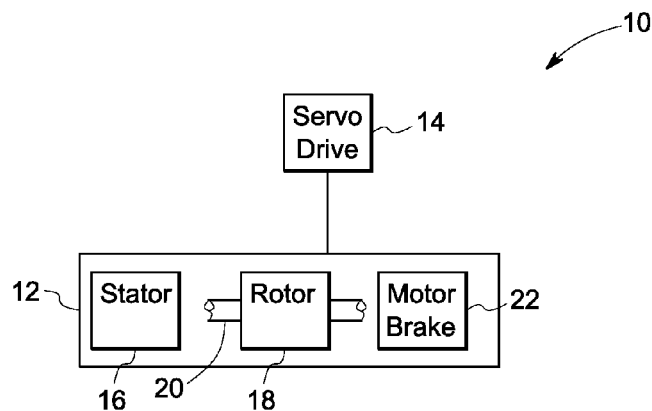
FIG. 1 illustrates an embodiment of a servomotor system in accordance with aspects of the present technique.

Turning now to drawings and referring first to FIG. 1, a servomotor system 10 is illustrated. As illustrated, the servomotor system 10 includes a motor 12 and a servo drive 14 electrically coupled to the motor 12. In the illustrated embodiment, the motor 12 is a three-phase motor such as employed in applications such as metal forming, automotive and material handling and packaging applications. However, other configurations of the motor 12 may be envisaged, including single phase motors. Moreover, the motor may be of any desired power, voltage, and frequency rating, depending upon the application and the standards of the local power grid. The servo drive 14 may include a single axis or a multi axis drive. In general, the motor will include a stator 16 to which drive signals are applied, and a rotor 18 that responds to rotating magnetic fields generated by the stator 16 to drive an output shaft 20 in rotation. In presently contemplated embodiments, the motor 12 may be driven both clockwise and counter-clockwise, although the present techniques may be applied to single-directional motors as well.

In addition, the servomotor system 10 includes a motor brake 22 configured to selectively brake the motor 12 such as required in an event of system malfunction, as will be described below. The motor brake 22 may include a combination of mechanical, electrical brakes configured to brake the rotor 18 of the motor 12. As will be appreciated by those skilled in the art, such brakes will typically include one or more mechanical braking elements that are biased towards an extension of the rotor shaft 20. An electrical coil releases the elements from the rotor 18 to permit rotation.

Figure 2:
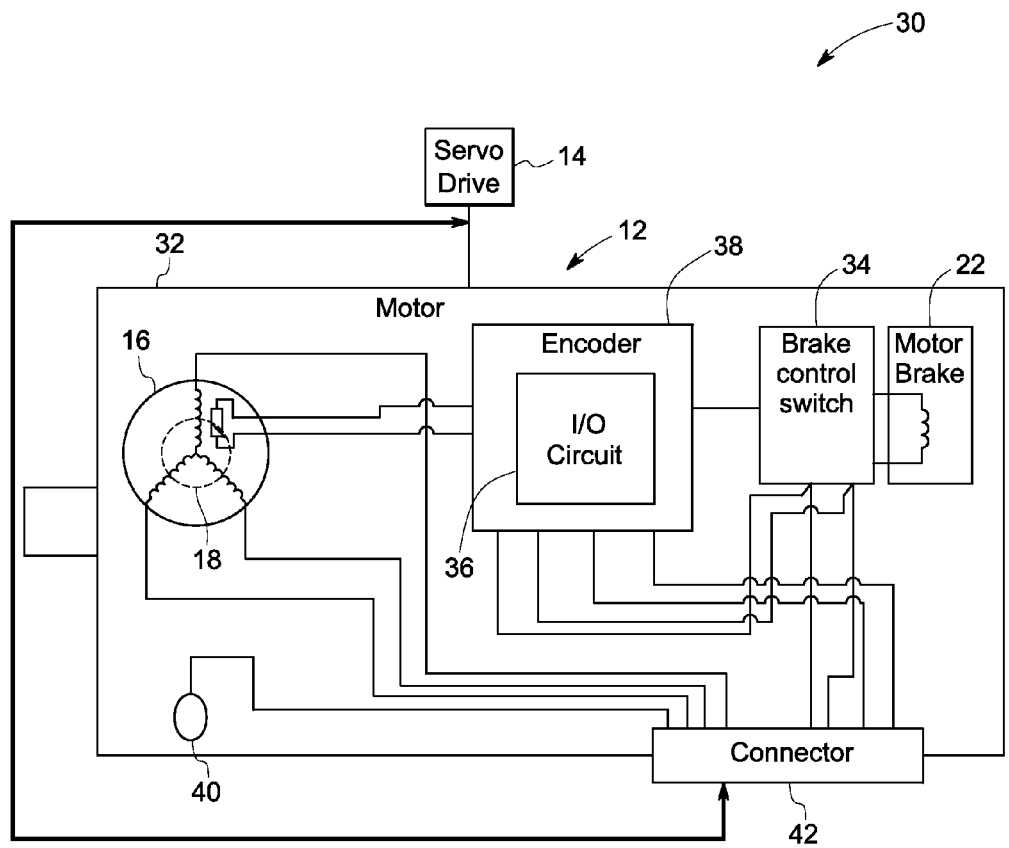
FIG. 2 is an exemplary configuration of the servomotor system of FIG. 1 in accordance with aspects of the present invention.

FIG. 2 is an exemplary configuration 30 of the servomotor system 10 of FIG. 1 in accordance with aspects of the present invention. The servomotor system 30 includes an enclosure 32 in which the motor stator 16 and the rotor 18 are disposed.

In this embodiment, the servo drive 14 is configured to provide power to the stator 16 of the motor 12.

In the illustrated embodiment, the rotor 18 rotates bidirectionally in operation. The servomotor system 30 includes the motor brake 22 configured to selectively brake the rotor 18 from rotation. As described above, in operation, the motor brake 22 is configured to permit free rotation of the rotor 18 when power is applied to the motor brake 22, and to brake the rotor 18 when power is removed from the motor brake 22. A brake control switch 34 is disposed in the enclosure 32 and is coupled to the motor brake 22 for selectively providing power to the motor brake 22, thereby selectively engaging and/or disengaging the motor brake 22.

The servomotor system 30 further includes an input/output circuit 36 disposed in the enclosure 32 and coupled to the brake control switch 34 for applying control signals to the brake control switch 34. In operation, the brake control switch 34 selectively engages and/or disengages the motor brake 22 in response to the control signals from the input/output circuit 36. In one exemplary embodiment, the input/output circuit 36 is disposed in, part of, or itself includes an encoder 38 of the servomotor system 30. The encoder 38 is disposed in the enclosure 32 and is configured to monitor position of the shaft 20 of the servomotor system 30 (from which other parameters such as velocity and acceleration may be developed).

In the illustrated embodiment, the input/output circuit 36 and the brake control switch 34 are coupled to a common source of power 40. In certain embodiments, circuitry external to the enclosure 32 is configured to apply brake signals to the input/output circuit 36 for control of the motor brake 22. In the illustrated embodiment, the circuitry comprises the servo drive 14. In this embodiment, a connector 42 is employed to electrically couple the different components such as the stator 16, rotor 18 and input/output circuit 36 to the power source 40.

In certain embodiments, the control signals from the input/output circuit 36 are at a voltage level different from the power provided by the brake control switch 34 to the motor brake 22. In one exemplary embodiment, the voltage level of the control signals is approximately 5 volts and the voltage level of the power provided by the brake control switch 34 to the motor brake 22 is approximately 24 volts. That is, the control signals themselves are not capable of powering the motor brake 22.

In operation, the input/output circuit 36 provides control signals to the brake control switch 34, which in turn, engages or disengages the motor brake 22 in response to the control signals. In certain embodiments, the motor brake 22 includes a braking device with a biasing spring and a coil to release the brake in response to the control signals. However, other types of braking devices may be employed.

Figure 3:
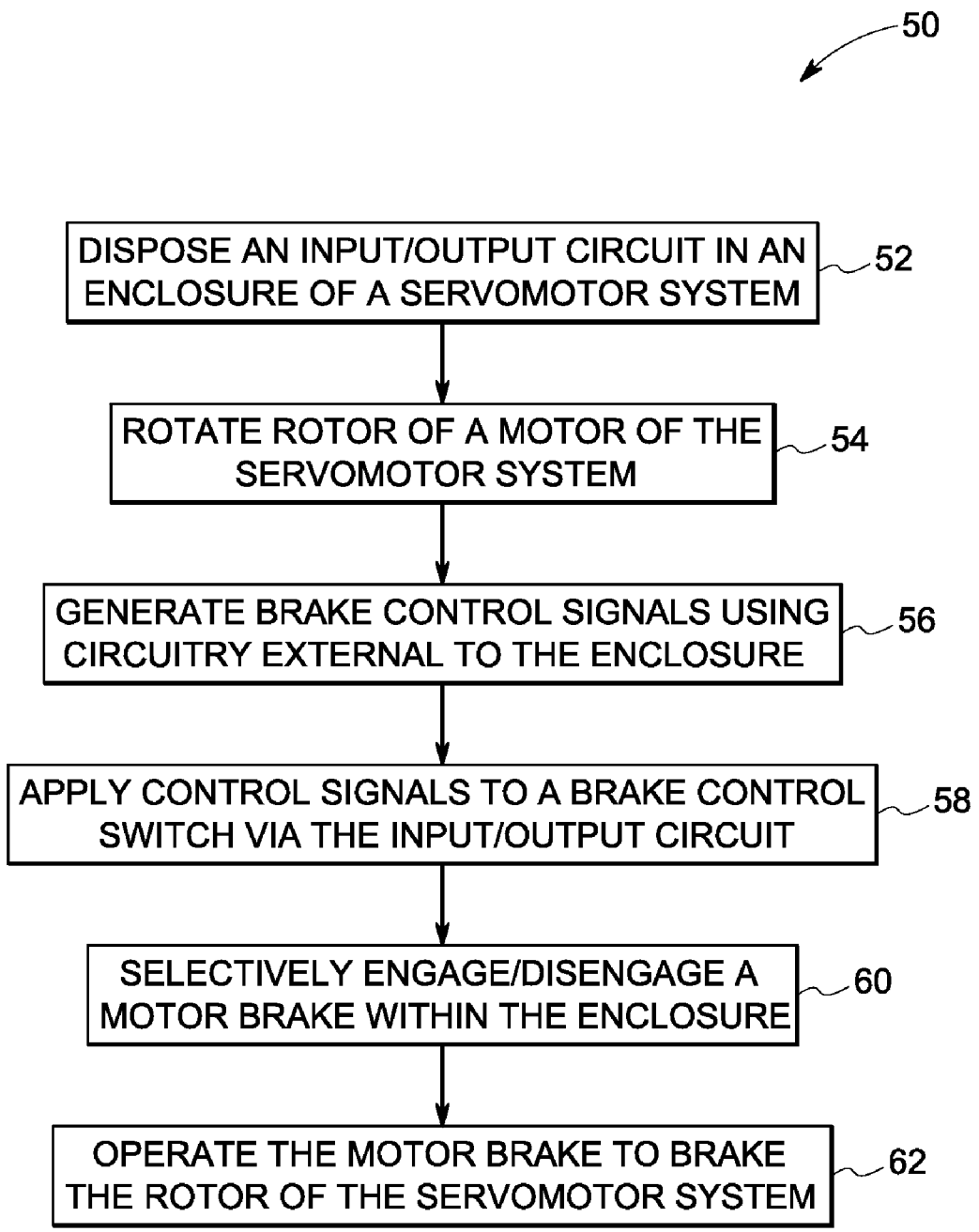
FIG. 3 illustrates an exemplary process of braking of the rotor of the servomotor system of FIG. 2 in accordance with aspects of the present invention.

FIG. 3 illustrates an exemplary process 50 of braking of the rotor 18 of the servomotor system 30 of FIG. 2 in accordance with aspects of the present invention. At block 52, an input/output circuit is disposed in an enclosure of the servomotor system. In one exemplary embodiment, the input/output circuit is an integral component of an encoder of the servomotor system. Further, the rotor of a motor of the servomotor system is rotated during operation of the servomotor system (block 54).

At block 56, brake control signals are generated through circuitry external to the enclosure of the servomotor system, typically in the servo drive discussed above. In this exemplary embodiment, the brake control signals are generated via a servo drive of the servomotor system. Further, the generated control signals are applied to a brake control switch via the input/output circuit (block 58). At block 60, a motor brake is selectively engaged and/or disengaged in response to the applied control signals. The motor brake is operated to stop and/or to hold the rotor based upon the control signals (block 62). In one embodiment, the rotor is rotated when power is applied to the motor brake.

As will be appreciated by those of ordinary skill in the art, the foregoing example, demonstrations, and process steps may be implemented by suitable code on a processor-based system, such as one or more microprocessors, FPGAs or other processors in the servo drive (with some processing functionality being provided in the motor enclosure as well, when desired). It should also be noted that different implementations of the present technique may perform some or all of the steps described herein in different orders or substantially concurrently, that is, in parallel.

Furthermore, the functions of the processor and motor may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory. Moreover, the signals provided by the servo drive to the motor, particularly for control of the brake via the input/output circuit and brake control switch, may be communicated in accordance with any suitable communications protocol, typically an industrial control or communications protocol, although more general purpose protocols may be used.

The various aspects of the structures described hereinabove may be used for controlling braking of a motor. In particular, the technique provides an integrated brake system disposed in the motor of a servomotor system for selectively engaging/disengaging a motor brake of such systems. The integrated brake system includes an input/output circuit disposed in an encoder of the servomotor system thereby allowing brake controlling operations to be moved from the drive to the motor. The technique allows for the integrated brake system to be included only in systems that require braking functionality thereby reducing overall manufacturing and operational costs of motor drive systems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A servomotor system, comprising:
    an enclosure;
    a motor stator and rotor disposed in the enclosure;
    a motor brake disposed in the enclosure and configured to selectively brake the rotor from rotation; and
    a brake control switch disposed in the enclosure and coupled to the motor brake for selectively providing power to the motor brake for selectively engaging and/or disengaging the brake.

2. The system of claim 1, comprising an input/output circuit disposed in the enclosure and coupled to the brake control switch for applying control signals to the brake control switch, the brake control switch being configured to selectively engage and/or disengage the brake in response to the control signals.

3. The system of claim 2, wherein the input/output circuit and the brake control switch are coupled to a common source of power.

4. The system of claim 2, wherein the control signals are at a voltage level different from the power provided by the brake control switch to the motor brake.

5. The system of claim 4, wherein the voltage level of the control signals is approximately 5 volts, and the voltage level of the power provided by the brake control switch to the motor brake is approximately 24 volts.

6. The system of claim 2, comprising a servo drive electrically coupled to the enclosure and configured to provide power to the stator.

7. The system of claim 6, wherein the servo drive is configured to apply brake signals to the input/output circuit for control of the brake.

8. The system of claim 1, wherein the motor brake is configured to permit free rotation of the rotor when power is applied to the brake, and to brake the rotor when power is removed from the brake.

9. The system of claim 1, wherein the rotor rotates bidirectionally in operation.

10. The system of claim 1, wherein the motor is a three-phase motor.

11. A servomotor system comprising:
   an enclosure;
   a motor stator and rotor disposed in the enclosure;
   a motor brake disposed in the enclosure and configured to selectively brake the rotor from rotation;
   a brake control switch disposed in the enclosure and coupled to the motor brake for selectively providing power to the motor brake for selectively engaging and/or disengaging the brake;
   an input/output circuit disposed in the enclosure and coupled to the brake control switch for applying control signals to the brake control switch, the brake control switch being configured to selectively engage and/or disengage the brake in response to the control signals; and
   circuitry external to the enclosure configured to apply brake signals to the input/output circuit for control of the brake.

12. The system of claim 11, wherein the circuitry external to the enclosure comprises a servo drive configured to provide power to the stator.

13. The system of claim 11, comprising an encoder disposed in the enclosure and configured to monitor position of a shaft of the servomotor system.

14. The system of claim 13, wherein the input/output circuit is disposed within the encoder.

15. The system of claim 14, wherein the brake control switch is configured to receive control signals from the input/output circuit at a voltage level of approximately 5 volts and to provide power to the motor brake at a voltage level of approximately 24 volts.

16. A method of braking a rotor of a servomotor system, comprising:
   applying control signals to a brake control switch using an input/output circuit disposed within an enclosure of the servomotor system, wherein the enclosure houses a motor rotor and stator of the servomotor system; and
   selectively engaging and/or disengaging a motor brake disposed within the enclosure in response to the control signals.

17. The method of claim 16, comprising generating the control signals via circuitry external to the enclosure.

18. The method of claim 17, wherein the circuitry comprises a servo drive configured to provide power to the stator of the servomotor system.

19. The method of claim 16, comprising:
   rotating the rotor when power is applied to the motor brake; and
   braking the rotor when power is removed from the motor brake.

20. The method of claim 15, comprising coupling the brake control switch and the input/output switch to a common power source.

* * * * *